Patented July 18, 1933

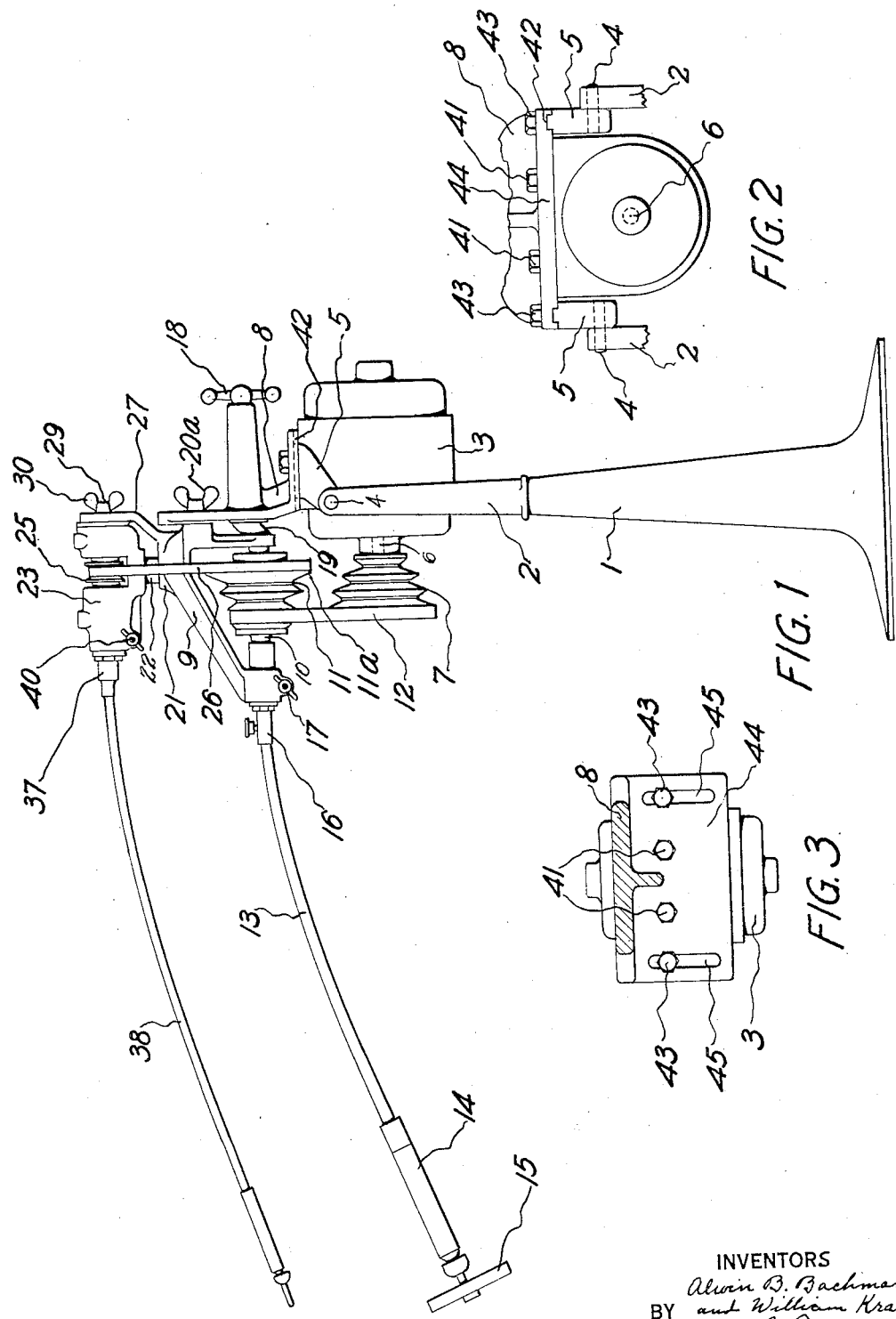

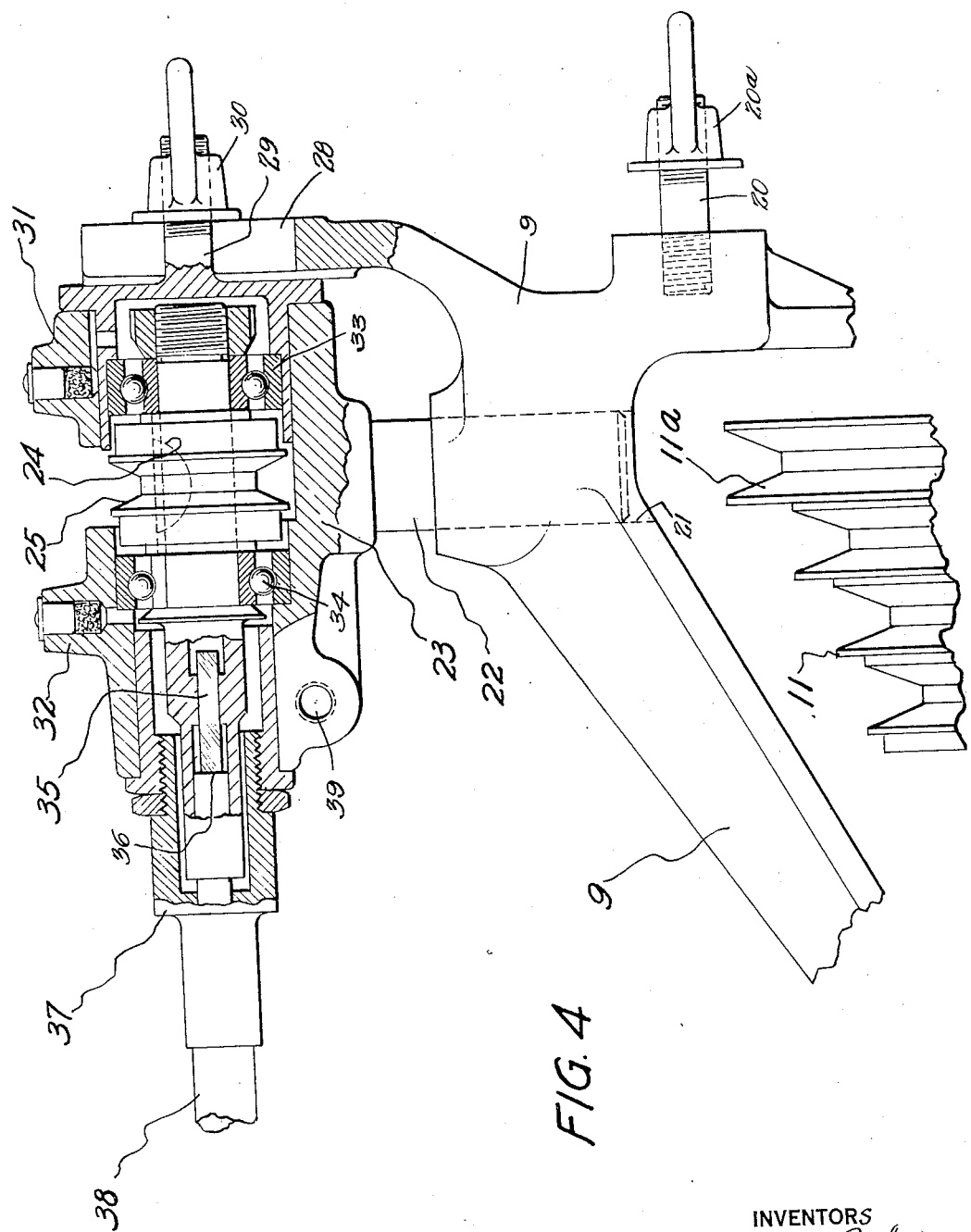

1,918,952

UNITED STATES PATENT OFFICE

ALWIN B. BACHMANN, OF BROOKLYN, AND WILLIAM KRAUSE, OF BRONX, NEW YORK, ASSIGNORS TO PRATT & WHITNEY COMPANY, OF HARTFORD, CONNECTICUT, A CORPORATION OF NEW JERSEY

FLEXIBLE SHAFT BENCH GRINDER

Application filed October 17, 1930. Serial No. 489,338.

This improvement relates to flexible shaft bench grinders of the portable type, in which an electric motor is pivotally mounted in a swivel yoke for movement in a vertical plane, the swivel mounting of the yoke permitting movement in a horizontal plane. Such bench grinders are well known on the market and the flexible shaft for normal speeds for axial drive by a jack shaft mounted in a bracket supported on the motor, and belt connections are provided between cone pulleys on the motor and jack shaft for providing normal or ordinary speeds.

In this type of bench grinder higher than normal speeds are frequently required for small tools in order to obtain satisfactory results and for this purpose it has been found desirable to incorporate another drive or provide an attachment for axial drive of a high speed flexible shaft, which may be used in addition to or independently of the normal speed flexible shaft, that is, one or both may be used at the same time.

One object, therefore, of the present improvement is to provide means for operating an auxiliary high speed flexible shaft which is preferably supported on the same bracket as the jack shaft for the flexible shaft drive for normal speeds. The arrangement is such that the auxiliary flexible shaft is driven at a speed considerably higher than can be obtained from the normal flexible shaft drive.

Another object is to provide a novel scheme for balancing the motor and its associated flexible shaft drives, relative to the pivotal mounting in the swivel fork. This is an important feature for the ordinary bench grinder with normal speed flexible shaft drive, and more particularly important when the high speed feature of the present improvement is incorporated. By properly balancing the motor and associated flexible shaft drive parts, so that there is substantially no overweight on either side of the pivot suspension, little effort will be required on the part of the operator to move or adjust the device for any job, and sharp bends in the flexible shaft are prevented, thereby reducing the friction between the flexible shaft and its sheath. It also makes it easier for the operator to handle the hand piece without feeling the drag from the weight of the cable and sheath.

One form of the improvement is shown in the accompanying drawings, in which Fig. 1 is a view in side elevation of a bench grinder with the high speed attachment; Fig. 2 is an end view of the motor showing the pivotal mounting in the yoke and is intended to indicate the balancing feature; Fig. 3 is a detailed plan view of the adjustable balancing bracket supporting the motor; and Fig. 4 is an enlarged broken-away view, showing a vertical section through the high speed drive on the jack shaft bracket.

Referring to the drawings, the supporting pedestal 1 has mounted thereon a yoke 2, adapted to swivel in the pedestal, or rotate in a horizontal plane. The motor 3 is pivotally suspended in the arms of the yoke 2 by pivots 4, extending from bracket arms 5, as will be seen in Figs. 1 and 2.

The shaft 6 of the motor is provided with cone pulleys 7, three pulleys being shown in the present form. A bracket 8 mounted on the motor 3 carries or supports an adjustable jack shaft bracket 9 in which a jack shaft 10 is mounted, the jack shaft being provided with a corresponding set of cone pulleys 11, which may be connected with the pulleys 7 of the motor by a belt 12.

The jack shaft 10 is adapted to be connected for axial drive of a flexible shaft 13, carrying the usual hand piece 14, for driving a grinding wheel 15 or other suitable tool. The sheath of the flexible shaft 13 is connected with a thimble or end piece 16, which is adapted to be clamped in the jack shaft bracket 9 by means of a wing nut at 17.

In order to provide for loosening and tightening the belt 12, when a change of speed is required by shifting the belt from one cone pulley to another, the jack shaft bracket 9 is adapted to be moved or shifted with relation to the motor pulleys. This is preferably accomplished by means of the handle 18, operating an eccentric at 19 and after the pulleys are shifted the bracket 9 may be clamped in any adjusted position by means of a wing nut 20, operating on a bolt stud passing through a slot in the bracket 8. This flexible shaft drive and the construction thus far described is more particularly shown in Bachmann Patent No. 1,575,307 of March 2, 1926.

Single flexible shaft bench grinders of this type are well known on the market, but as previously pointed out, the present improvement contemplates incorporating therewith a high speed flexible shaft drive, which may operate with or independently of the regular flexible shaft drive.

For this purpose, the jack shaft bracket 9 is provided with a socket at 21 for receiving therein a stud 22 formed on the lower end of an auxiliary bracket 23, adapted to support a ball bearing spindle 24 (see Fig. 4) for axial drive of an auxiliary flexible shaft at high speed. The high speed spindle 24 is provided with a pulley 25, mounted in line with one of the cone pulleys 11 on the jack shaft 10, preferably the cone pulley 11a of largest diameter, and is adapted to be driven thereby by the belt 26.

In order to drive the high speed flexible shaft the bracket 23 is adjusted to tension the belt 26 and for this purpose the jack shaft bracket 9 is provided with an upwardly extending arm or lug 27, provided with a slot at 28, through which a stud 29 projects, the stud being threaded and provided with a wing nut 30 for clamping the bracket 23 to the lug 27, in any adjusted position.

From Fig. 4, it will be seen that the spindle bracket 23 is bored out longitudinally and divided by a transverse opening, in which the pulley 25 is located, into two bearing supports 31 and 32, in which ball bearings 33 and 34 are mounted for rotatably supporting the high speed spindle 24. The spindle 24 is provided with a squared socket at 35, in which the end of the high speed flexible shaft 36 is adapted to be inserted when the thimble 37, connected with the cable sheath 38, is inserted in the end of the bracket 23 and clamped therein by means of the bolt 39 and the usual wing nut 40.

Attention has been called to the fact that it is desirable to provide for proper balancing of the motor and the associated flexible shaft drive or drives, relative to the suspension pivot 4, and for this purpose, the bracket arms 5 instead of being integral with the bracket member 8, which is secured to the motor by bolts 41, as indicated in Fig. 3, the arms 5 are slidably and adjustably mounted on the bracket 8, preferably by tongue and groove connection, as indicated at 42 in Fig. 2, and are adapted to be clamped in adjusted position by means of stud bolts 43. The base portion 44 of the bracket 8 is provided with slots 45, in which the stud bolts 43 are adapted to slide, thereby providing for shifting of the center of gravity of the motor and associated parts, relative to the pivot 4, after which the arms 5 may be securely clamped to the base 44 of the bracket 8, by means of the bolts 43. By this means, proper balancing of the motor and the associated drives and flexible shafts may be secured.

In the present arrangement, the ratio between the cone pulley 11a and the pulley 25, on the high speed spindle is such as to increase the speed approximately three to one, so that the high speed flexible shaft 36 is adapted to be driven at considerably higher speed than the normal drive of the flexible shaft 13, thereby providing for the use of small tools, which are required to be driven at very high speed. As indicated in the drawings, the flexible shaft 36 and sheath 38 may be smaller and lighter for the high speed drive than the flexible shaft 13, which is adapted to be driven at normal speeds for coarser or heavier work.

The operation will be readily understood from the foregoing description, and it will be understood that, if desired, either of the flexible shafts may be removed, while the other is being operated by the machine and when so removed, the balancing of the device may be readjusted by adjusting the brackets 5 by means of the screws and slots 43, 45, and similarly the adjustment may be made for proper balancing of the motor and associated parts when both flexible shafts are attached or when a longer or heavier cable is substituted.

As shown in Fig. 1, the belt 12 is mounted between the largest of the motor cone pulleys 7 and the smallest of the jack shaft cone pulleys 11, giving the highest ratio of speed available in the arrangement shown, but obviously, if a slightly lower speed is required, the belt 12 may be shifted to the middle size pulleys by loosening the wing nut 20a, and shifting the jack shaft bracket 9 by means of the eccentric operated by the handle 18 and thereafter again tensioning the belt and clamping the wing nut 20a.

It will be understood that while the preferred form and arrangement has been shown, the specific details thereof may be changed considerably without departing from the spirit and scope of the invention.

We claim:

1. A flexible shaft bench grinder of the character described, wherein the motor and flexible shaft driving connections therefrom are suspended in a yoke for movement in a vertical plane, pulleys on the motor shaft, a jack shaft adapted for axial drive of a flexible shaft at normal speeds, pulleys on the jack shaft for driving the latter by means of a belt from one of the motor pulleys, and a high speed flexible shaft drive comprising a spindle adapted for axial drive of an auxiliary flexible shaft, a pulley on said spindle adapted to be driven by a belt from one of said pulleys on the jack shaft, the arrangement being such that the auxiliary flexible shaft is driven at relatively high speed, and means for shifting the motor and the associated flexible shaft driving connections transversely of the pivotal suspensions in said yoke for balancing the suspended parts relative to the pivot.

2. A flexible shaft bench grinder of the character described, comprising a motor with cone pulleys, a bracket mounted on said motor for supporting a jack shaft for axial drive of a flexible shaft at normal speeds, cone pulleys on said jack shaft and a belt between the corresponding pulleys of the motor and jack shaft, a spindle bearing bracket adjustably supported on the jack shaft bracket and cooperative means for adjustment thereof relative to the jack shaft, a spindle in said bearing bracket, a pulley mounted on said spindle for rotating the same for axial drive of an auxiliary flexible shaft and belt connections between said spindle pulley and one of the cone pulleys on the jack shaft for driving said auxiliary flexible shaft at higher speed than the flexible shaft driven by said jack shaft, said motor and associated connections for both flexible shafts being as a unit adjustably mounted on brackets and pivotally supported in a yoke, the arrangement being such that the center of gravity of the motor and associated parts may be shifted relative to the pivotal support in said yoke.

3. A flexible shaft bench grinder of the character described comprising a motor with cone pulleys on the shaft thereof, an L-bracket mounted on said motor, a jack shaft frame supported by said bracket, a jack shaft and cone pulleys rotatably supported in said frame, a flexible shaft connected to be driven by said jack pulleys, means for securing the sheath of the flexible shaft to said jack shaft frame, said jack shaft pulleys being driven by a belt from the cone pulleys of the motor, means for adjusting said jack shaft frame for tightening said belt, means for clamping said jack shaft frame to the L-bracket in adjusted position, a high speed spindle bearing bracket supported in said jack shaft frame, a high speed spindle with a single pulley mounted in said bearing bracket, a belt to said single pulley from the jack shaft pulleys, a slotted arm projecting from said jack shaft frame, a screw stud and clamp nut carried by said spindle bearing bracket, said stud passing through said slotted arm for maintaining the high speed spindle parallel with the jack shaft and said nut cooperating therewith for clamping the spindle bracket in any adjusted position when adjusting the belt between said spindle pulley and one of the pulleys of said jack shaft, and a flexible shaft connected with and adapted to be driven by said high speed spindle.

ALWIN B. BACHMANN.
WILLIAM KRAUSE.